(12) United States Patent
Fuhrmann et al.

(10) Patent No.: US 10,848,566 B2
(45) Date of Patent: Nov. 24, 2020

(54) COMMUNICATIONS NETWORK

(71) Applicant: DAIMLER AG, Stuttgart (DE)

(72) Inventors: Daniel Fuhrmann, Böblingen (DE); Stefanie Klein, Beuren (DE)

(73) Assignee: DAIMLER AG, Stuttgart (DE)

( * ) Notice: Subject to any disclaimer, the term of this patent is extended or adjusted under 35 U.S.C. 154(b) by 0 days.

(21) Appl. No.: 16/631,310

(22) PCT Filed: Jun. 18, 2018

(86) PCT No.: PCT/EP2018/066050
§ 371 (c)(1),
(2) Date: Jan. 15, 2020

(87) PCT Pub. No.: WO2019/015898
PCT Pub. Date: Jan. 24, 2019

(65) Prior Publication Data
US 2020/0213399 A1     Jul. 2, 2020

(30) Foreign Application Priority Data

Jul. 20, 2017 (DE) .................. 10 2017 006 927

(51) Int. Cl.
*H04W 4/44*       (2018.01)
*H04L 29/08*      (2006.01)
(Continued)

(52) U.S. Cl.
CPC .......... *H04L 67/125* (2013.01); *H04L 12/283* (2013.01); *H04W 4/44* (2018.02); *H04W 4/70* (2018.02)

(58) Field of Classification Search
CPC ..... H04L 67/12; H04L 12/283; H04L 67/125; G08C 19/00; H04W 4/44; H04W 4/70
(Continued)

(56) References Cited

U.S. PATENT DOCUMENTS 8,370,020 B2    2/2013   Bauman et al.
9,426,222 B2 *  8/2016   Wang .................. H04L 41/0233
(Continued)

FOREIGN PATENT DOCUMENTS

DE    102008022771 A1    12/2008
DE    102009019753 A1    11/2010
DE    102012202688 A1    8/2013

OTHER PUBLICATIONS

Examination Report created on Mar. 5, 2018 in related/corresponding DE Application No. 10 2017 006 927.1.
(Continued)

Primary Examiner — Frantz B Jean
(74) Attorney, Agent, or Firm — Patent Portfolio Builders (57) ABSTRACT

A communications network for exchanging data between a vehicle and domestic technology devices includes having a local network of the domestic technology, having communication interfaces between the individual domestic technology devices and the local network, at least one communication connection between the vehicle and an application assigned to the vehicle, having a mediating function for connecting the application with the local network of the domestic technology, which is designed to exchange data between the application and individual domestic technology devices. Status signals of the vehicle or of domestic technology devices and/or functions of the domestic technology devices or of vehicle functions are assigned via at least one link table.

20 Claims, 5 Drawing Sheets

(51) Int. Cl.
*H04W 4/70* (2018.01)
*H04L 12/28* (2006.01)

(58) Field of Classification Search
USPC .......................................................... 709/204
See application file for complete search history.

(56) References Cited

U.S. PATENT DOCUMENTS

| 10,292,028 B2 * | 5/2019 | Kaliner ............... H04L 61/6054 |
| 2012/0112694 A1 | 5/2012 | Frisch et al. |
| 2015/0102899 A1 | 4/2015 | Kim et al. |
| 2015/0331494 A1 | 11/2015 | Mizuno |
| 2016/0261425 A1 * | 9/2016 | Horton ................ H04L 12/2818 |
| 2020/0096993 A1 * | 3/2020 | Cella .................... H04B 17/309 |

OTHER PUBLICATIONS

International Search Report dated Aug. 30, 2018 in related/corresponding International Application No. PCT/EP2018/066050.

Kim et al., "Proof Concept of Home IoT Connected Vehicles," Sensors, Jun. 2017, vol. 17, No. 6.

Ur et al., "Practical Trigger-Action Programming in the Smart Home," CHI '14: Proceedings of the SIGCHI Conference on Human Factors in Computing Systems; Apr. 26-May 1, 2014, Toronto, ON, CA.

Written Opinion dated Aug. 30, 2018 in related/corresponding International Application No. PCT/EP2018/066050.

* cited by examiner

| Function status (vehicle) | Function implementation (domestic technology devices) |
|---|---|
| Charging status = 100 % | Illumination of a defined light colour in a chosen room |
| Auxiliary heater heated to target temperature | Illumination of a defined light colour in a chosen room |
| Air conditioning has target temperature | Illumination of a defined light colour in a chosen room |
| Vehicle window open | Illumination of a defined light colour in a chosen room |
| Locking system open | Illumination of a defined light colour in a chosen room |
| Charging status of the battery very low (because the battery discharges when at a standstill) | Illumination of a defined light colour in a chosen room |
| Alarm system | Illumination of multiple defined colours (if possible) in a chosen room |
| Traffic warning | Illumination of a defined light colour in a chosen room |
| Rain sensor (detects rain) | House windows are closed |

| Function status (domestic technology devices) | Function implementation (vehicle) |
|---|---|
| Room-heating/air conditioning at a target temperature | Illumination of a defined light colour in the vehicle lighting |
| Window open/closed | Illumination of a defined light colour in the vehicle lighting |
| Light on/off | Illumination of a defined light colour in the vehicle lighting |
| Camera/motion detector registers movements | Illumination of a defined light colour in the vehicle lighting (if image from the surveillance camera is possibly shown on the display) |
| Cooker on | Illumination of a defined light colour in the vehicle lighting |
| Electricity still flowing through defined sockets when leaving the house | Illumination of a defined light colour in the vehicle lighting |
| Smoke detector triggered | Illumination of a defined light colour in the vehicle lighting (notification on display, can only be removed by the confirmation of the driver) |
| Blinds up/down | Illumination of a defined light colour in the vehicle lighting |
| Garage door open | Illumination of a defined light colour in the vehicle lighting |

COMMUNICATIONS NETWORK

BACKGROUND AND SUMMARY OF THE INVENTION

Exemplary embodiments of the invention relate to a communications network for exchanging data between a vehicle and domestic technology devices. In addition, exemplary embodiments of the invention relate to a method for linking vehicle functions and functions of domestic technology devices in such a communications network.

In the field of domestic technology, there are more and more technical domestic technology devices that can be used online, which are connected to one another via a local network, for example, a cable-based network or a wireless network, and which can be controlled, for example, via applications on, preferably mobile, terminal devices such as smartphones. The control access typically takes place via the local network of the domestic technology, which is often also connected to the Internet, such that worldwide remote access to the local network of the domestic technology and thereby ultimately to the domestic technology devices is possible. A wireless interface, a WLAN connection or Bluetooth connection to mobile devices offers an alternative for the control of the domestic technology devices when remote access over greater distances is not necessary. Examples of such online-ready domestic technology devices are, for example, refrigerators, televisions and, in particular, lighting devices which can be controlled with programming with regard to the times for turning on and off, the generated light colors etc. In this context, Smart Homes or Smart Home Applications are also discussed.

The prior art in the form of DE 10 2012 202 688 A1 is aware of networking between an at least partially electrically powered vehicle, which is supposed to be recharged via an electric home network, and at least the charging station as a piece of online-ready domestic technology. The electrical charging of the battery of the vehicle can accordingly be controlled via a terminal device such as a smartphone, such that power, for example, from a regenerative source can then be used, if it is available, provided that the use of the vehicle is not supposed to take place immediately. The energy mix can hereby be optimized, such that the recharging, for example, of the vehicle can predominantly occur with regenerative energy. A further decisive option is that the vehicle can provide feedback to the mobile device so that it is apparent on the mobile device whether the battery of the vehicle is fully charged or not. However, this always makes the access to the mobile terminal device necessary for the user, which is accordingly complex and results, for example, in the user frequently having to interact with the mobile terminal device if he continuously wants to be informed of the charging status of his vehicle battery.

US 2016/0 261 425 A1 describes a communications network between a Smart Home, a vehicle, a Cloud and an application, a so-called app. A control and a remote control of functions via the communications network is possible by means of a transmission of data via the Cloud. Thermostats, for example, can be turned on in this way when the vehicle approaches the Smart Home.

The article UR, B.; et al.: "Practical trigger-action programming in the smart home" in Proceedings of the SIGCHI Conference on Human Factors in Computing Systems, Toronto, Ontario, Canada, pp. 803-812, April 2014 describes the control of Smart Home functions via trigger tables in the manner of a remote control.

It is also known from the article KIM, Y., et al.: "Proof of Concept of Home IoT Connected Vehicles". Collotta M., ed. Sensors (Basel, Switzerland). 17.06.2017. 1289. http://doi.Org/10.3390/sl 7061289 to include vehicles in such a communications environment.

DE 10 2009 019 753 A1 discloses an intelligent charging station, which communicates with the vehicle via the server of an energy service provider in order to control charging processes and simplify billing for the charging.

DE 10 2008 022 771 A1, which deals with the transmission of sensor data and diagnostic data of a vehicle to a server, is known from a comparable environment. Via a telecommunications connection such as GPRS, UMTS or LTE or other kinds of radio standards, the data can be collected from sensors of the vehicle and functional conditions of the vehicle can thus be determined. The data can be transmitted, continuously or as required, as diagnostic data to a server such as that of a service provider, in order to be prepared for this vehicle in the workshop in the event of a workshop visit of the vehicle, so that the repair can be carried out quickly and efficiently. A user terminal device can be integrated to the extent that the data from the vehicle is accordingly transmitted to the server via the user terminal device and its telecommunications network. The data are then transferred from the server into the workshop, for example, in which the next workshop visit is planned, so that a direct communication connection between the vehicle and the workshop is not necessary.

Exemplary embodiments of the present invention are directed to a communications network, based on the features in the first named prior art, in such a way that status signals of the vehicle or of domestic technology devices can be visualized very easily and perceptibly.

The communications network according to the invention serves for the exchange of data between a vehicle and domestic technology devices. It comprises a local network of the domestic technology as well as communication interfaces between the individual devices and the local network of the domestic technology. Moreover, at least one communication link between the vehicle and an application assigned to the vehicle is provided. This application can, for example, be carried out in the vehicle itself, on a stationary or mobile terminal device or particularly on an external server, such as the server of a service provider or the vehicle manufacturer. The communications network according to the invention further comprises a mediating function for linking this application with the local network of the domestic technology, which is designed to exchange data between the application and individual domestic technology devices. According to the invention, functions of the domestic technology devices or vehicle functions are assigned to status signals of the vehicle or status signals of the domestic technology devices via at least one link table. The link table in the communications network according to the invention thereby enables a design of device-specific functions of the domestic technology or of functions of the vehicle independent of a remote control by the user, as is normally the case with traditional Smart Home applications. Nevertheless, these can be present parallel with or in addition to the teaching according to the invention. It is the aim of the communications network according to the invention that the local network of the domestic technology is comprehensively informed, for example, of the current status of a selected vehicle and depicts this status of the vehicle through the corresponding functions of the domestic technology devices. A charging status of a battery of the vehicle can, for example, be visualized by adjusting the light color of a domestic technology device for lighting. The communication can thereby also occur in the other direction, such that an unclosed window in the house, for example, is communicated to the vehicle via a corresponding sensor of domestic technology and is optically, haptically and/or acoustically represented there, for example, by a change of the lighting color of the ambient interior lighting or another kind of display function. This type of networking can cause, for example, a reaction of the domestic technology devices if a rain sensor as a domestic technology device reacts at the same as the sunroof of the vehicle or convertible top of the vehicle is open, in case this is designed as a convertible, which visualizes the problem to the user of the vehicle, for example, by lighting elements within the domestic technology changing their color. At the same time, a kind of control can also occur in this way so that the windows or the sunroof or convertible top can be closed.

An advantageous design of the communications network according to the invention provides that the mediating function forwards the data in accordance with the at least one link table to specific devices or vehicle functions, wherein the specific devices or vehicle functions are designed to execute functions that are predetermined by the data or which correspond to the data stored in the link table. The data can include, when they arrive at the domestic technology from the vehicle, for example, how the individual domestic technology devices are supposed to react, for example, such that a light in the living room of the user changes color in the desired manner when the battery of the vehicle is fully charged, or that the alarm system of the house is activated in the case of an attempted break-in into the vehicle parked in front of the house, or similar.

As already mentioned, the communication can occur from the vehicle in the direction of the local network of the domestic technology as well as the other way around. Ideally, one link table for the one communication direction and one link table for the second communication direction is thereby provided.

A favorable design of the communications network according to the invention now also provides that the at least one link table is localized in the application assigned to the vehicle. The at least one link table, or in particular one link table in each of the communication directions, can, in particular, be located in the application in this instance. This application plays the deciding role in the communications network according to the invention because it ultimately coordinates the implementation of communication from the vehicle to the application and further to the local network of the domestic technology or vice versa. It is thus particularly simple and efficient to provide the at least one link table within the application.

A very advantageous development provides that the application is formed independently of the local network of the domestic technology as well as independently of the vehicle and enables a communication between the vehicle and the local network of the domestic technology. The application then assumes the central role within the communications network. It is thereby possible to communicate between the application and the vehicle via the application and its connection to the vehicle via the means of communication, in particular a telecommunication such as via GPRS, UMTS, LTE or similar, and on the other hand, to communicate between the application and the local network of the domestic technology, for example, via an Internet connection and a router in the local network of the domestic technology or similar. The whole functionality is hereby possible without a direct communication connection between the vehicle and the local network of the domestic technology having to be established.

This is then in particular a decisive advantage if the application, according to a very favorable design of this idea, can be operated on an external server, especially that of a service provider. The whole communication can then be handled via such an external server. This has the decisive advantage that the connection between the local network of the domestic technology and thus ultimately the functionality of the devices of the domestic technology and the functions in the vehicle can be carried out independently of the distance of the vehicle from the house and a direct connection, which can in principle also be supplementary or parallel, for example via a Bluetooth connection or similar. The driver or user of the vehicle can then draw conclusions about the status of his domestic technology devices by means of the functions in the user's vehicle when the user is relatively far away from home, for example, on the way to work, on a trip or similar.

The application can be, in particular, an internet application and/or as an application on a mobile terminal device, such as a smartphone, or can be controlled via such an application as a user interface. This enables a very high flexibility and a high customer benefit, since a very simple and efficient control is thereby possible, which is practically independent of the residence of the user and in particular independent of its proximity on the one hand to the domestic technology and on the other hand to the vehicle, in particular via a mobile terminal device such as a smartphone.

As already mentioned above, the mediating function, according to an advantageous further development of the idea, can be implemented via an Internet connection between the application and a router of the local network of the domestic technology. The communications connection between the vehicle and the application can be implemented via a radio communication. The local network of the domestic technology can be implemented as a WLAN- or Bluetooth network, for example, such that very simple and efficient new domestic technology devices have to be integrated without cabling thereof being necessary.

The method according to the invention for the linking of vehicle functions and functions of domestic technology devices in a communications network of this kind provides that functional implementations represent a function status of status signals of the vehicle through the domestic technology devices, and that function implementations of the vehicle represent a function status of status signals of domestic technology devices. Thus, individual or even all statuses of the vehicle or the domestic technology devices can be displayed via the method according to the invention through corresponding functions in the domestic technology devices or in the vehicle, such that the user, regardless of whether he is at home or in the vehicle, is always informed of the functions of the vehicle or his domestic technology devices. For this, the user does not need to study a complex display, which can show the user the functions in multiple layers, but rather the information is simply and efficiently conveyed via a function of the domestic technology devices, for example, through an influence on the lighting within the domestic technology or vice versa on the ambient interior lighting in the vehicle.

The allocation of function implementations and function statuses thereby takes places via the at least one link table.

According to an advantageous development of the method, the function statuses and their supplementary visualization can thereby occur via a terminal device, in particular a mobile one. The, in particular mobile, terminal device can be a stationary computer, for example, or in particular a smartphone. Due to this, the function statuses can be visualized in addition to the information about the domestic technology devices or the vehicle functions. According to an advantageous development of the idea, it can thereby be provided that, via the, in particular mobile, terminal device, functions of the vehicle and/or the domestic technology devices can be triggered. Thus, in addition to the respective displaying of the function statuses of the one system through functions in the other system, a control system, as is already known from the field of Smart Homes, is possible for the domestic technology devices as well as new vehicle functions.

In particular, the at least one link table can be changed or at least parametrized via the, in particular mobile, terminal device. The function statuses and the associated functions are saved in the at least one link table. Due to a change or parametrizing, every function can, for example, be individually adapted to different functionalities. It is thus conceivable, for example, that a switched-on cooker, which has accordingly been detected by the domestic technology, is visualized in the vehicle. This can occur, for example, by illuminating the ambient vehicle lighting in a specific color. Due to the option of changing or parametrizing, the user can now choose, for example, the color in which such a warning should occur. For functional statuses that are particularly important to the user, the user can, for example, use strong warning colors such as red or similar; for other things, which are less important from the user's point of view, the user can choose other colors or other functions. This enables the link table and thus ultimately the function of the communications network according to the invention or the method according to the invention to adapt to the individual requirements of the respective person.

According to a very advantageous development of the method, a user interface of the, in particular mobile, terminal device offers a choice in a first, top layer between functions of the domestic technology devices and functions of the vehicle. Such a user interface, which can, in particular, be an application or app on a smartphone, can thus, in its top user interface, offer the choice in principle whether functions of the domestic technology or of the vehicle should be managed. In the subordinate level, the functions of the domestic technology or of the vehicle can then be managed depending on the selection in the first level according to an advantageous further development of this idea. New functions, for example, could be created, the reaction to functions, thereby ultimately the link table, can be adapted, or function statuses can be directly seen in the application on the terminal device.

A further very advantageous design further provides that the user interface has a status display for a successful or unsuccessful examination of functions of the domestic technology or of the vehicle. In this way, an examination of the domestic technology devices can be carried out by managing the functions, such that the devices of a networked alarm system are examined to determine whether they are functioning. Subsequently, it can be very easily and efficiently visualized using the status displays whether the alarm system is functional and in operation or whether there is a fault.

Something comparable is also self-evident for any other functions of the domestic technology and is conceivable on the side of the vehicle, such that individual function regions of the vehicle or the whole vehicle can be reviewed. The status display detects whether the vehicle is completely functional or whether there is a corresponding fault or, for example, whether a service must occur soon, which can be shown, for example, through an intermediate stage in the representation, in particular in the form of a traffic light representation with green, orange and red.

In principle, all functions are suited to visualize corresponding function statuses, for example, of the vehicle by means of the domestic technology or domestic technologies, through the vehicle. It is simply necessary that the user has programmed the link table themselves or knows the links, such that the user can assign the occurring functionalities to the corresponding function statuses. However, according to an extraordinarily simple development of the idea, the representation of the function statuses occurs via an adjustment of light in the domestic technology devices and/or in the vehicle. Such a visualization via an adjustment of light is particularly simple and efficient. Light can be used very diversely in its brightness, color, duty cycle, a switch-on rhythm, such as flashing at different speeds or similar, in order to visualize functional statuses simply and highly efficiently. As domestic technology devices, which are freely programmable, lighting devices are thereby one of the main applications of Smart Home applications in any case and are thus available correspondingly simply and efficiently. It is also the case with vehicles that the lighting of instruments and the lighting of the interior is increasingly being carried out using complex lighting strategies in order to support the wellbeing of the vehicle user by means of the so-called ambient interior lighting. Here, it is also very easily and efficiently possible to visualize information by means of light intensity, light color or the periodic switching on and off of the lighting, such that a very simple and efficient possibility to represent the function statuses of the domestic technology devices in the vehicle is made possible through an adaptation of the light.

Moreover, further advantageous designs of the communications network according to the invention arise from the exemplary embodiment, which is subsequently expanded upon with reference to the figures.

BRIEF DESCRIPTION OF THE DRAWING FIGURES

Here are shown.

DETAILED DESCRIPTION

Figure 1:
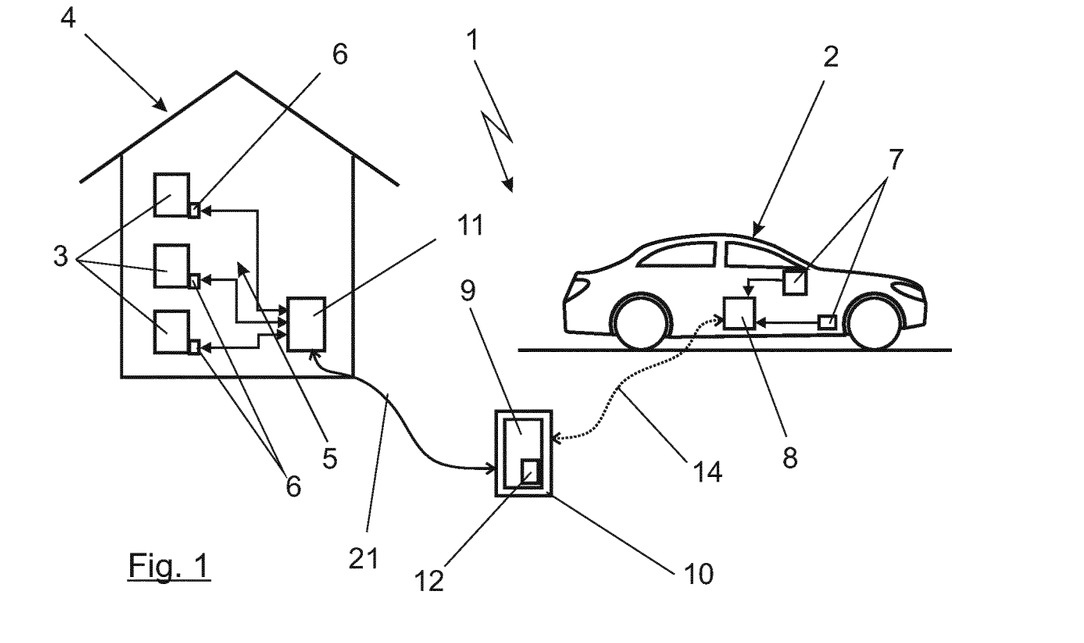
FIG. 1 a representation in principle of a possible communications network according to the invention FIG. 2 a visualization of the communication direction from the vehicle to the domestic technology.

In the representation of FIG. 1, a communications network 1 is represented highly schematized for the exchange of data between a vehicle 2 and domestic technology devices 3 installed in a house 4. The domestic technology devices 3 are connected to each other via a local network 5 of the domestic technology. This can be designed, for example, as a cable-bound LAN, or as a wireless network, for example as WLAN, Bluetooth network or similar. The individual domestic technology devices 3 are thereby respectively connected to each other or to the local network 5 of the domestic technology via communication interfaces 6 such as gateways, bridges or similar. In the vehicle 2, corresponding sensors 7 are installed, wherein two of the sensors 7 are in principle indicated here. Via a telecommunications unit 8 in the vehicle, a connection to an application 9 can be established, to which the corresponding sensor data for symbolizing the function statuses of the vehicle 2 can be transmitted. The application 9, for example, is operated on a backend server designated as 10 of a service provider, for example, of the vehicle manufacturer or a provider of Smart Home technologies.

The local network 5 of the domestic technology possesses a router 11, via which, for example, a connection to the Internet is possible. Via such an Internet connection 21, a communication can now be implemented on the backend server 10 between the router 11 and thereby the local network 5 of the domestic technology and the application 9. This connection can include a mediating function on the part of the application 9 as well as on the part of the router 11, in order to connect the application 9 to the local network 5 of the domestic technology in the house 4, wherein the mediating function is designed to exchange data between the application 9 and individual domestic technology devices 3. Via a link table 12 indicated in the representation of FIG. 1 in the region of application 9, wherein multiple link tables of this kind may also be available here, which do not all necessarily have to be localized in the region of the application 9, status signal from the sensors 7 of the vehicle 2 or from the domestic technology devices 3 and functions of the domestic technology devices 3 or functions of the vehicle 2 can be assigned. Due to the communications network indicated in principle in FIG. 1, it is thereby possible to represent a function status of the sensors 7 in the vehicle by means of the domestic technology devices 3, and vice versa. Depending on the status of individual sensors 7 in the vehicle, a different function can be carried out by means of the domestic technology devices 3 in the house 4. This will subsequently be explained in more detail.

Figure 2:
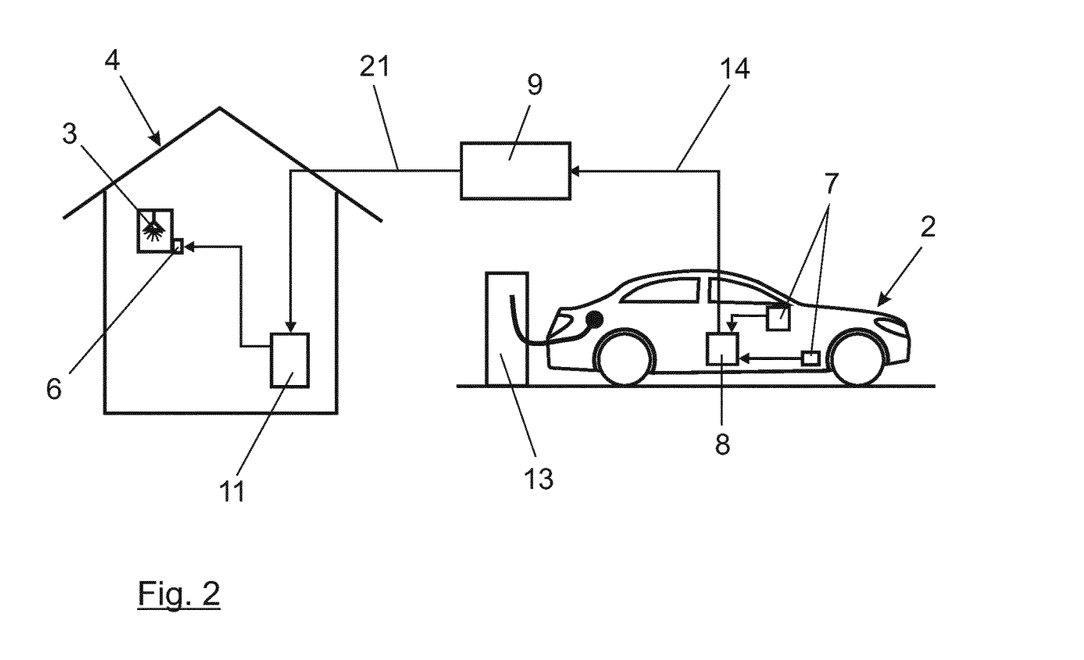
Figure 3:
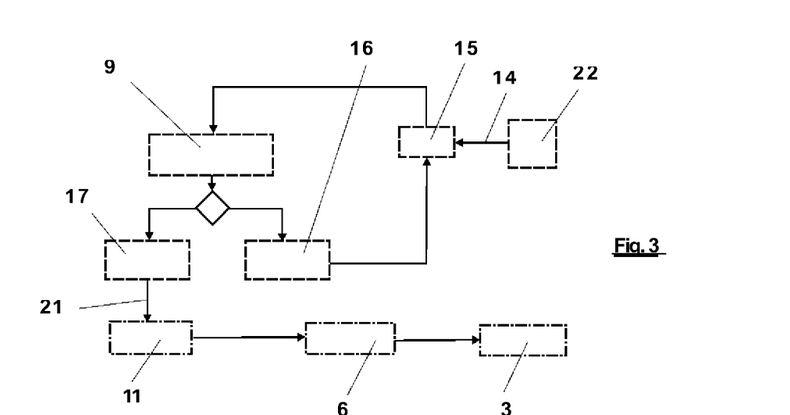
FIG. 3 a flow chart for FIG. 2.
Figure 4:
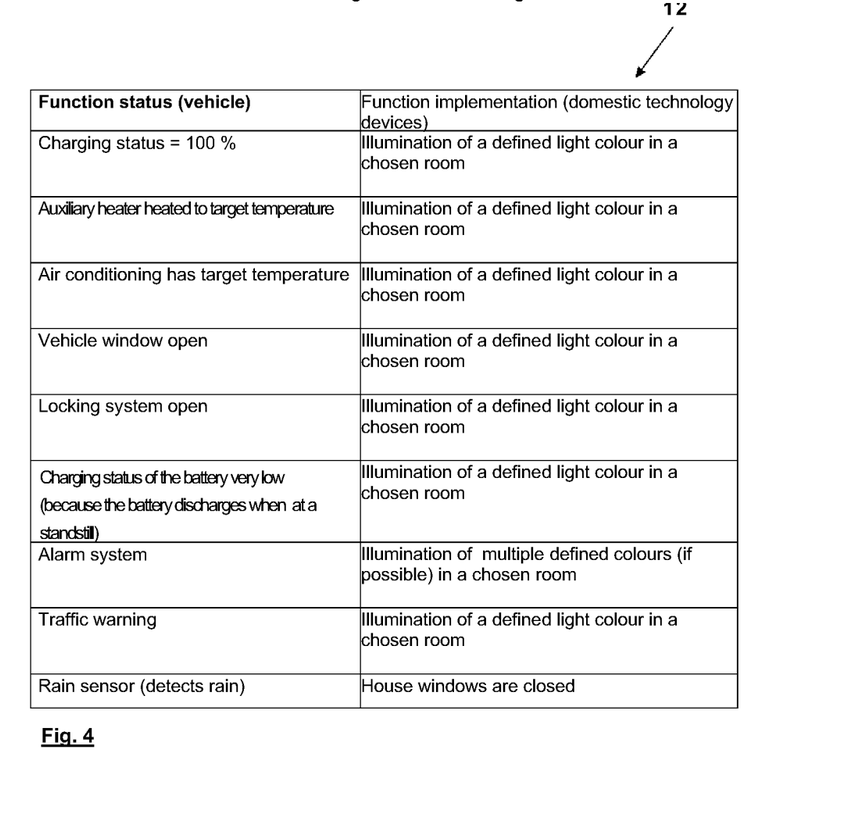
FIG. 4 an exemplary link table for FIG. 2 and FIG. 3.

In FIGS. 2 to 4, the display of function statuses of the sensors 7 in the vehicle 2, exemplarily indicated in FIG. 1, is now exemplarily explained by functions of the domestic technology devices 3 in the house 4. The example is thereby based on different individual function statuses of the sensors 7 in the vehicle. Function statuses of the vehicle 2 that go beyond this and corresponding functions of the domestic technology devices 3 are naturally also conceivable; all the exemplary embodiments should therefore not be understood as limiting.

In the representation of FIG. 2, the house 4 is once again indicated, as well as a domestic technology device 3, for example, here an illumination device. In addition, the vehicle 2 is indicated merely as an example connected to a charging station designated as 13. Via one of the sensors 7 in the vehicle 2, the information is now generated that the batteries of the vehicle 2, which is designed, for example, as a plug-in hybrid or electric vehicle, are fully charged. This status signal of the sensor 7 is transmitted via a communication connection 14 by means of the telecommunications unit 8 to the application 9. The application, for example, the application "Mercedes me" can then communicate via the Internet connection 12 and the router represented here in turn and designated as 10 and the communication interface 6 with the illumination device as domestic technology device 3. A possible schedule for this can be seen in the representation of FIG. 3. The boxes surrounded by dashes thereby symbolize processes on the part of the vehicle including processes in the application 9, the dot-dashed boxes symbolize processes within the domestic technology of the house 4. The box designated as 22 provides the data of one or multiple sensors 7 in the vehicle 2 via the communication connection 14. A status signal 15 generated in such a way is then evaluated in the application 9. A comparison thus occurs to determine whether or not the status signal corresponds to a current requirement from the application 9 or the link table 12. If the status signal 15 does not correspond to the requirement or condition, as is indicated by the box 16, then the process starts from the beginning, such that a new status signal 15 is requested from the vehicle 2 via the communications connection 14. If the status of the status signal 15 does correspond to the requirement, then a mediating function for the Internet connection 21 with the router 11 is carried out through the box 17, so that a suitable domestic technology device 3 can be controlled via the router 11 and the communication interface 6 in order to carry out a function correspondingly stored in the link table 12. In the example represented in FIG. 3, the color of the device 3 indicated as an illumination device in FIG. 2 can be changed at a moment's notice, for example, where the charging status of the battery of the vehicle reaches 100%, for example, by changing the light color to green.

Different examples of status signals 15 in the vehicle 2 and linked functions of devices 3 in the local network 5 of the domestic technology are indicated by way of example in the link table 12 of FIG. 4. In this way, an illumination of a defined light color can occur in a chosen room, for example, when the charging status is 100%. Something similar can occur, for example, when the target temperature is achieved by the auxiliary heater or the air conditioning, or if the locking system of the vehicle 2 or vehicle windows are open. A very low battery status can also be correspondingly indicated. The illumination of defined colors in chosen rooms in the event of a reaction of the alarm system of the vehicle 2 is also possible. In addition, if the rain sensor has detected rain, for example, an action within the house 4 can occur, so that the windows of the house 4 are closed, for example, if these have the corresponding functionality of the domestic technology. It is also possible, for example, to transmit a traffic warning on a frequently used route or a route already programmed into the navigation system of the vehicle 2 to the house 4 by lighting up in a defined color in the house 4, so that the user of vehicle 2 can plan an extended journey time.

In this instance, either individual lamps in the house 4 can be defined as domestic technology devices 3, which correspondingly represent the function status of individual sensors 7 in the vehicle 2 via a color change, or the entire lighting of the house 4 takes on a desired color for a defined period of time. The definition of the individual colors, the rooms, the duration for which the colors illuminate, or also other functions such as closing the windows by means of the domestic technology devices 3 or similar can thus be freely determined in an application, via which the link table 12 can be programmed or at least parametrized.

Figure 5:
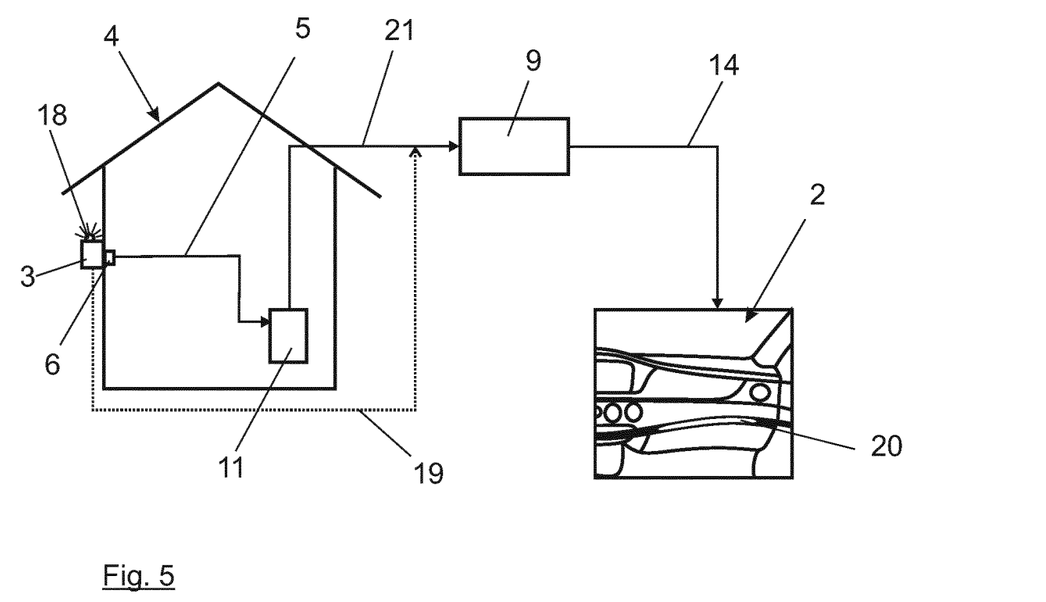
FIG. 5 a visualization of the communication direction from the domestic technology to the vehicle.
Figure 6:
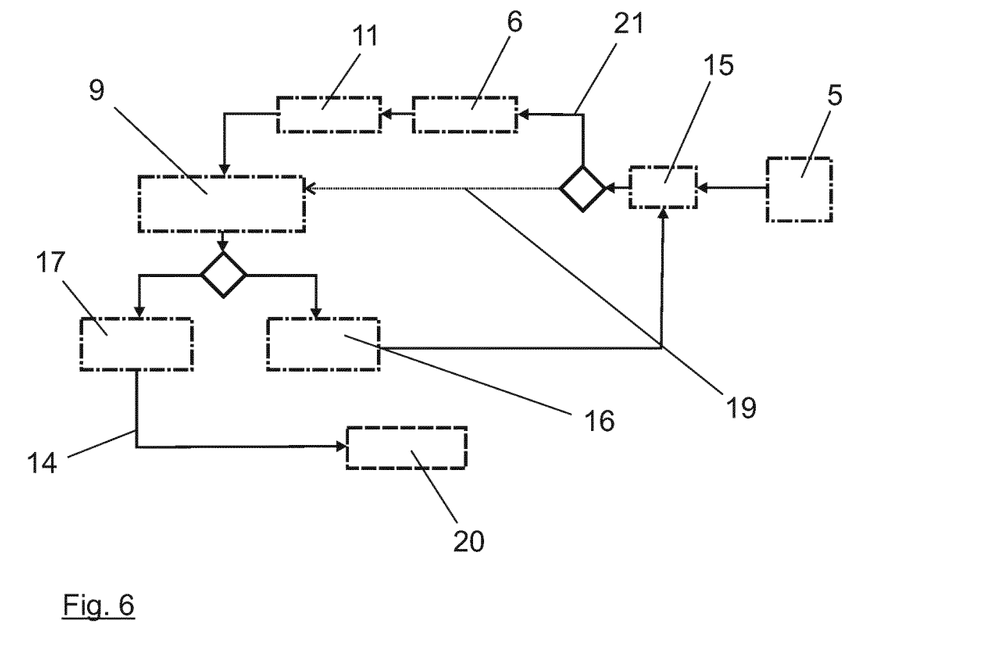
FIG. 6 a flow chart for FIG. 3.
Figure 7:
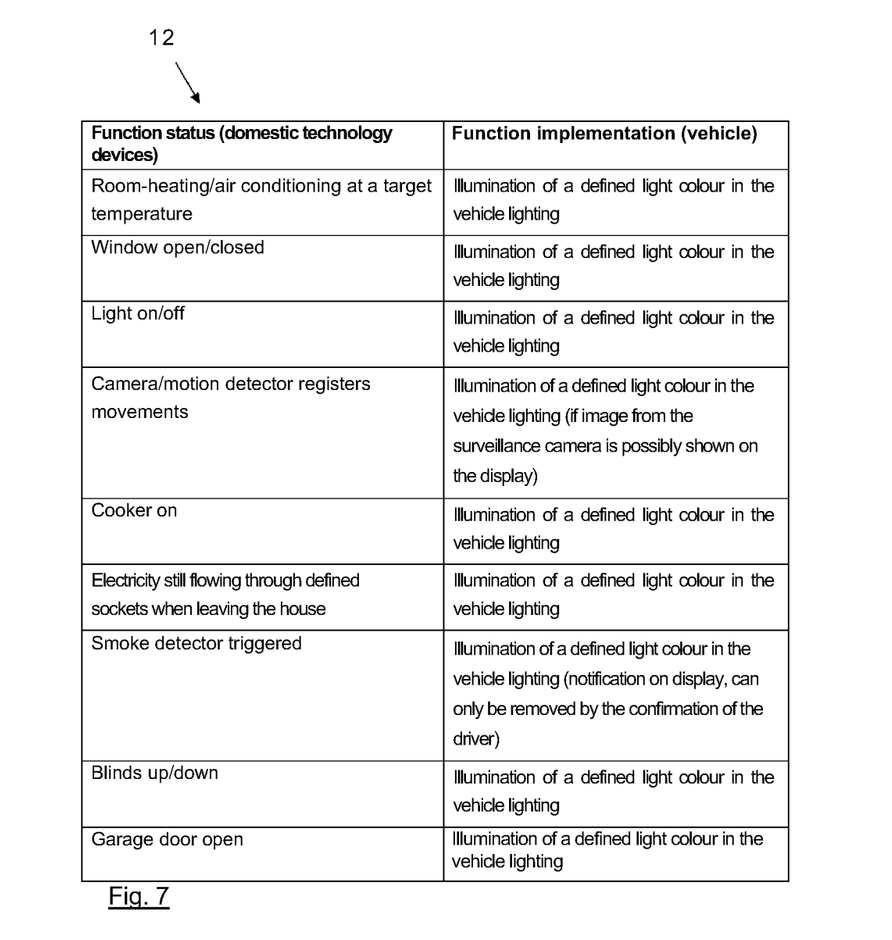
FIG. 7 an exemplary link table for FIGS. 5 and 6.

In FIGS. 5, 6 and 7, the opposite communication direction is now indicated. In this way, an alarm system as a domestic technology device 3 can, for example, be triggered, which is symbolized in the representation of FIG. 5 by the illumination of an outdoor light 18 of this alarm system as a domestic technology device 3. Via a communication interface 6, for example in the form of a bridge, and the router 11 or alternatively an indicated Bluetooth connection 19, this information that the alarm system has addressed as one of the domestic technology devices 3 can in turn be transmitted to the application 9. In the vehicle 2, for example, an ambient vehicle illumination 20 in the interior of the vehicle 2, as is indicated in the representation of FIG. 5, can be correspondingly controlled and light up, for example, permanently or in flashes in a given light color.

A possible process is indicated analogously to the representation in FIG. 3 in FIG. 6 for the communication direction described here. A status signal 15, which originates from the local network 5 of the domestic technology, is transmitted, for example, to the application 9 via the communication interface 6 and the router 11 or the Bluetooth connection 19. In particular in the application 9, in which the link table 12 or even multiple link tables 12, such as one per communication direction, can be stored, it is then checked again whether the status signal 15 corresponds to a specified condition, which can be established, for example, via an application related to application 9, or not. Analogously to the representation in FIG. 3, a new query is triggered via the box 16 in the event that the status signal 15 does not correspond to the requirement. Otherwise the communication is triggered again via the box designated as 17. The transmission then takes place via the communication connection 14 to the vehicle and is implemented, for example, through the illumination of the ambient vehicle lighting 20 referred to in FIG. 5.

Different applications are thereby again indicated in a link table 12, which is shown in FIG. 7. Status signals 15 in the house 4 can comprise, for example, the room heating/air conditioning to a target temperature, the state of windows, open/closed, light on/off or similar. They can, as the table shows, in turn be implemented through the illumination of defined light colors of the ambient vehicle illumination 20. The displayed light color of the ambient vehicle illumination 20 in the vehicle 2 can here be assigned to the respective function, with regard to the color as well as with regard to possible effects, for example, a continuous light band and the number of repetitions. This assignment can occur, for example, inside the vehicle 2 or in the link table 12 and can be programmed via an application that is connected to the application 9, for example via a terminal device of the user, preferably a mobile terminal device such as a smartphone or similar.

Figure 8:
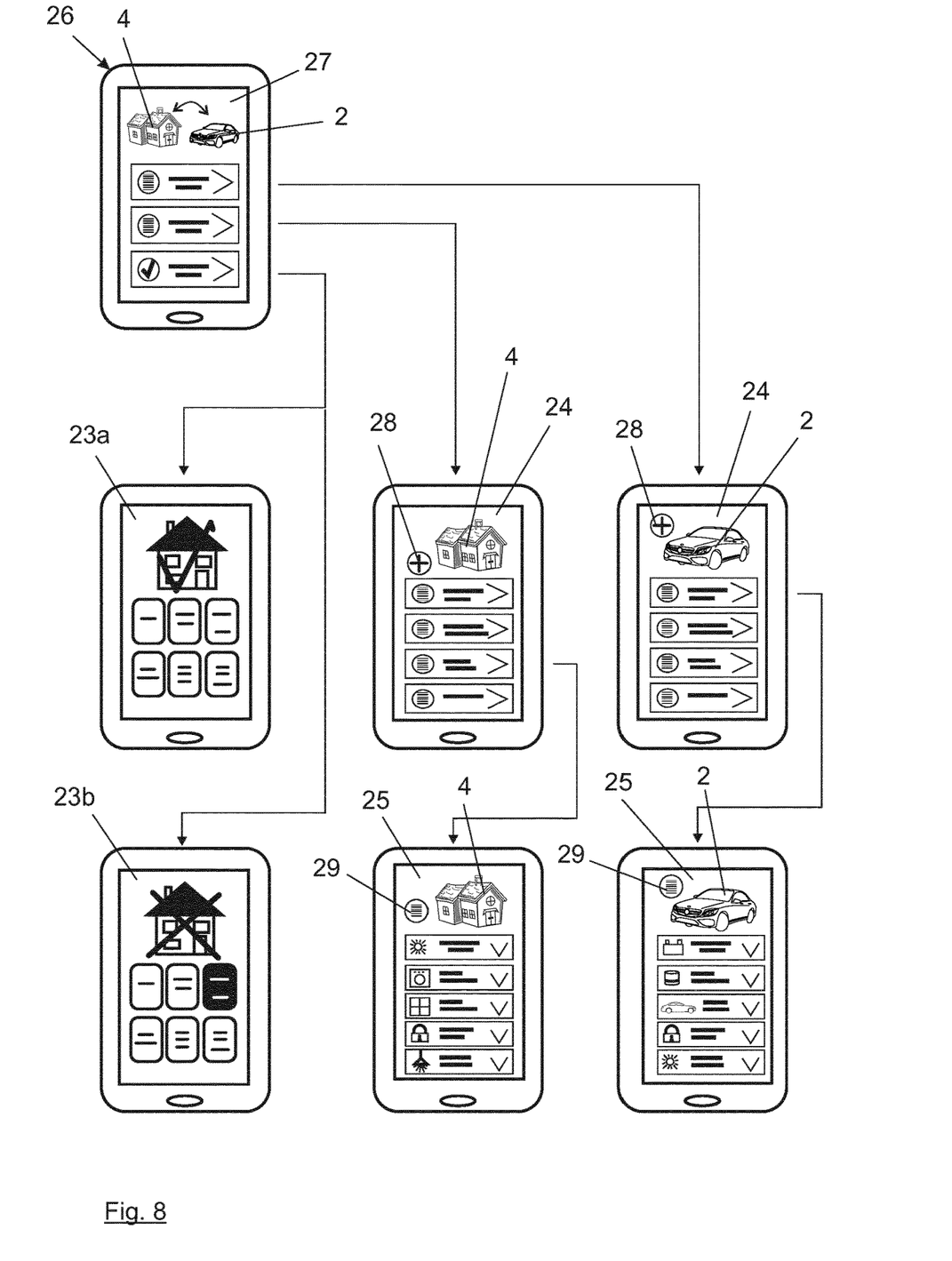
FIG. 8 a selection of representations via a user interface of a preferably mobile terminal device for monitoring and setting up the method according to the invention.

In the representation of FIG. 8, an operating concept is finally represented, as can be implemented, by way of example, on a mobile terminal device designated as 26, for example a smartphone. On the smartphone 26, an application (app) can be downloaded, which serves as a control interface for the user, and which is ultimately designed for controlling the application 9. In the representation of FIG. 8 above, the uppermost layer 27 of a user interface of the app is shown. Here, one can choose between the house 4 on the one hand and the vehicle 2 on the other hand, for example, by managing "home functions", managing "vehicle functions" or, for example, carrying out a "home check". In principle, this functionality of the review as part of the "Homecheck" could also be available for vehicle 2. The result of the Homecheck leads the user to a further operating level 23, which displays the successful review in case 23a and which displays an unsuccessful review in case 23b and at the same time correspondingly visualizes the error that has occurred.

Back to the uppermost or first level 27 of the user interface. If the functionality "manage home functions" is triggered here, for example, then a second level 24 lying underneath it is reached, which is defined through the house 4 as a level of the home functions. At this level 24, for example, the lighting, individual devices, an alarm system, devices such as washing machines, dishwashers or similar can be controlled accordingly and new functions can be added if necessary. When adding a new function via the "+"-surface 28, a third level 25 is reached, in which it can then be set what reaction should happen for what event of a domestic technology device 3 in the vehicle 2, for example, visually, haptically or acoustically, in which color, volume or the like. From this level 25, the second level 24 is then reached again via the surface 29, if the corresponding functions have been set. The same applies to the side of the vehicle, as shown in the representation of FIG. 8 on the right with the comparable levels 24, 25, but corresponding to the symbol for the vehicle 2. Here, the user can also create new vehicle functions, for example, by pressing the "+" surface 28, and then define them accordingly in the level 25 underneath. If the user has completed this, the user goes back and can carry out further management of vehicle functions on the second level 24 accordingly.

All in all, this allows a very intuitive representation of status signals 15, for example, of the vehicle 2 or the house 4 in the different system in each case, such that a user is fully informed without having to call up his own app in an appropriate terminal device in order to detect changes in signal statuses which are critical or interesting to the user. Rather, these changes are intuitively visualized by the user, for example, by setting the light color or similar, and necessary actions such as closing the windows, closing a convertible top or similar are carried out automatically if required.

Although the invention has been illustrated and described in detail by way of preferred embodiments, the invention is not limited by the examples disclosed, and other variations can be derived from these by the person skilled in the art without leaving the scope of the invention. It is therefore clear that there is a plurality of possible variations. It is also clear that embodiments stated by way of example are only really examples that are not to be seen as limiting the scope, application possibilities or configuration of the invention in any way. In fact, the preceding description and the description of the figures enable the person skilled in the art to implement the exemplary embodiments in concrete manner, wherein, with the knowledge of the disclosed inventive concept, the person skilled in the art is able to undertake various changes, for example, with regard to the functioning or arrangement of individual elements stated in an exemplary embodiment without leaving the scope of the invention, which is defined by the claims and their legal equivalents, such as further explanations in the description.

The invention claimed is:

1. A communications network for exchanging data between a vehicle and domestic technology devices, the communications network comprising:
   a local network of the domestic technology, having communication interfaces between individual ones of the domestic technology devices and the local network;
   at least one communication connection between the vehicle and an application assigned to the vehicle, wherein the application has a mediating function for connecting the application with the local network of the domestic technology, wherein the mediating function is configured to exchange data between the application and the individual ones of the domestic technology devices;
   at least one link table, wherein status signals of the vehicle, status signals of domestic technology devices, functions of the domestic technology devices, and vehicle functions are assigned via the at least one link table to represent the status signals of the vehicle using the functions of the domestic technology devices and to represent the status signals from domestic technology devices via the vehicle functions, wherein the vehicle functions are ambient interior lighting of the vehicle, which is adjusted, using the at least one link table, based on the function status of the status signal of the one of the domestic technology devices.

2. The communications network of claim 1, wherein the mediating function is configured to redirect the data according to the at least one link table to particular ones of the domestic technology devices or vehicle functions, wherein the particular ones of the domestic technology devices or vehicle functions are configured to perform functions predetermined by data or functions corresponding to data stored in the link table.

3. The communications network of claim 1, wherein the at least one link table includes a first link table for a communication from the vehicle to the local network of the domestic technology.

4. The communications network of claim 3, wherein the at least one link table further includes a second link table for a communication from the local network of the domestic technology to the vehicle.

5. The communications network of claim 1, wherein the application is designed independently of the local network of the domestic technology and of the vehicle and the application is configured for enabling an indirect communication between the vehicle and the local network of the domestic technology.

6. The communications network of claim 1, wherein the at least one link table is located in the application.

7. The communications network of claim 1, wherein the application is executed on an external server a service provider.

8. The communications network of claim 1, wherein the application is an Internet application and/or as an application on a terminal device, wherein the terminal device is mobile or has the application as a user interface.

9. The communications network of claim 1, wherein the mediating function is via an Internet connection between the application and a router of the local network of the domestic technology.

10. The communications network of claim 1, wherein the at least one communication connection is a radio connection.

11. The communications network of claim 1, wherein the local network of the domestic technology is wireless local access network and/or Bluetooth network.

12. A method for linking vehicle functions and functions of domestic technology devices in a communications network, the method comprising:
executing a function of at least one of the domestic technology devices responsive to a function status of a status signal of the vehicle; and
executing a function of the vehicle responsive to a function status of a status signal of one of the domestic technology devices, wherein the function of the vehicle that is executed is a change in ambient interior lighting of the vehicle based on the function status of the status signal of the one of the domestic technology devices.

13. The method of claim 12, wherein at least one link table includes an assignment of functions of the at least one of the domestic technology devices to status signals of the vehicle and an assignment of functions of the vehicle to status signals of the at least one of the domestic technology devices.

14. The method of claim 13, further comprising:
providing, via a mobile terminal, a supplementary visualization of the function status of the status signal of the vehicle or the one of the domestic technology devices.

15. The method of claim 14, further comprising:
triggering, via the mobile terminal, the function of the vehicle or the function of the at least one of the domestic technology devices.

16. The method of claim 15, further comprising:
changing or parameterizing the at least one link table via the mobile terminal.

17. The method of claim 15, further comprising:
displaying, via the mobile terminal, an interface providing a choice in a first, top layer between functions of the domestic technology devices and functions of the vehicle.

18. The method of claim 17, wherein the interface provides selections for managing the functions of the domestic technology or the functions of the vehicle in a second level, depending on the choice in the first, top layer.

19. The method of claim 18, further comprising:
displaying, via the interface, a status display for a successful or unsuccessful examination of function of the domestic technology devices and/or functions of the vehicle.

20. The method of claim 12, wherein a representation of the function status of the status signal of the vehicle occurs via an adjustment of light in the domestic technology devices.

* * * * *